United States Patent [19]

Miyaishi

[11] Patent Number: 4,737,137
[45] Date of Patent: Apr. 12, 1988

[54] ENDLESS TRANSMISSION BELT
[75] Inventor: Yoshinori Miyaishi, Okazaki, Japan
[73] Assignee: Aishi-Warner Kabushiki Kaisha, Aichi, Japan
[21] Appl. No.: 919,680
[22] Filed: Oct. 16, 1986
[30] Foreign Application Priority Data
Oct. 17, 1985 [JP] Japan .................... 60-232100
[51] Int. Cl.[4] .............................. F16G 5/18
[52] U.S. Cl. ............................ 474/245; 474/201
[58] Field of Search ............. 474/242, 244, 245, 201
[56] References Cited

U.S. PATENT DOCUMENTS 4,579,550 4/1986 Walker .................... 474/242
4,580,999 4/1986 Ledford .................. 474/201

FOREIGN PATENT DOCUMENTS 0109202 5/1984 European Pat. Off. ...... 474/201
8301942 1/1984 Netherlands ............... 474/245
2080477 2/1982 United Kingdom ........... 474/242

Primary Examiner—Stephen J. Novosad
Assistant Examiner—Thuy M. Bui
Attorney, Agent, or Firm—Wenderoth, Lind & Ponack

[57] ABSTRACT

An endless transmission belt has an endless link column of link plates interconnected by pins inserted through openings at each end of the link plates, V-blocks are disposed in the link column in between adjacent pairs of pins. The pins each include a pair of rockers having rolling contact surfaces on which they roll over one another. Each rocker is further provided with a flat engaging surface opposite the rolling contact surface, a first convex surface adjacent the engaging surface, and a second convex surface facing the inside of the belt. Each opening in the link plate is provided with a flat face which engages the engaging surface or the first convex surface on the rocker, while each V-block is provided with a trough having a first wall which engages the engaging surface or the first convex surface on the rocker, and a second wall which engages the second convex surface on the rocker.

4 Claims, 6 Drawing Sheets

ENDLESS TRANSMISSION BELT

FIELD OF THE INVENTION

The present invention relates to endless transmission belts, and in particular, to belts for use in continuous variable transmissions in which the belt is fitted around primary and secondary pulleys each comprising a pair of sheaves.

Such belts may be roughly divided into those commonly known as the Van Doorne type with V-blocks fitted serially on a belt comprising a lamination of thin endless steel sheets, and those commonly known as the chain type with link plates interconnected by pins.

The belts of the chain type may be further divided into those with the pins acting as frictional transmission elements contacting with the pulleys, those with friction transmitting elements fitted on the pins, those with the link plates acting as frictional transmission elements, those with friction transmitting elements fitted on the link plates and those with friction transmitting elements held in between the pins. The present invention relates to belts with friction transmitting elements (V-blocks) held in between the pins.

DESCRIPTION OF THE RELATED ART

In recent years, endless transmission belts of the chain type have been devised in which each pin comprises a pair of rockers with rolling contact surfaces over which they roll over one another.

For such belts, it is necessary to prevent relative rotation between each rocker and link plate. As a means of preventing such relative rotation, Japanese publication of examined patent application No. 35-14807 discloses providing a V-shaped groove on the rocker while providing a V-shaped projection on the link plate and engaging the groove with the projection, and Japanese publication of examined patent application No. 52-35833 discloses providing the rocker with a detent and the link plate with a projection to engage said detent. Japanese publication of examined patent application No. 58-3136 discloses providing the rocker with a trough on the face opposite the rolling contact surface so that the rocker contacts the link plate at two spaced-apart locations.

In the first two examples of the prior art mentioned above, the pin is prone to breakage due to stress concentration at the V-shaped groove or detent, while in the third example of prior art, the rigidity of the pin is impaired due to the existence of the trough, resulting in lack of durability.

Also because the V-shaped grooves, detents or depressions have an intricate shape and small dimensions manufacturing them is extremely difficult, leading to problems in the production of the belt.

In addition, in all of the prior art mentioned above, the pins themselves act as the frictional transmission element, and no consideration is made in relation to the use of V-blocks.

SUMMARY OF THE INVENTION

The present invention aims to provide an endless transmission belt which solves the problems of lack of durability and difficulty of production, in which the link plates and pins are securely held together.

The objects of the present invention are:
to improve the durability of the belt,
to improve the torque transmitting capacity of the belt,
to improve the transmission efficiency of the belt, and
to facilitate the production of the belt,
by, abolishing the grooves or detents on the rockers to avoid stress concentration, reducing the surface loading at points of contact between the pin and link plate to reduce wear, designing the cross section of rockers for facilitating smooth transition of the belt from straight to curved states and vice versa to enable the belt to flex smoothly, and using components having simple geometrical shapes comprising planar or curves surfaces which can be produced easily by pressing, extruding or machining.

According to the present invention, an endless transmission belt having a link column comprising a plurality of link plates interconnected into an endless loop by pins inserted through openings at each end of the elongated link plates with V-blocks held by said link column in between adjacent pairs of pins, the pins each comprising a pair of rockers provided with rolling contact surfaces on which they roll over one another. Each rocker is further provided with a substantially flat engaging surface opposite the rolling contact surface, a first convex surface adjacent to the engaging surface at the inside of the belt, and a second convex surface facing the inside of the belt.

The openings in the link plates each have a straight side which contacts the engaging surface of the rocker.

Each V-block is provided with a trough which has a first wall contacting the engaging surface or the first convex surface of the rocker, and a second wall engaging the second convex surface of the rocker.

The endless belt having such a construction is fitted around the primary and secondary pulleys when in use. Power is transmitted from the primary pulley to the V-blocks by frictional contact, and from the V-blocks to the link column through the pins. At the secondary end, the power is transmitted from the pins back to the V-blocks, and from the V-blocks to the secondary pulley by frictional contact.

As the belt passes over the pulleys, the pair of rockers roll over one another on their rolling contact surfaces, enabling the belt to flex smoothly.

The rockers press against each other at their rolling contact surfaces, forcing the engaging surfaces on their opposite sides into contact with the straight sides of the openings in the link plates. The rockers and link plates are held together by pressure contact between the two surfaces.

The V-blocks are continuously force outward, due to the force exerted by the pulleys when passing over the pulleys, and due to centrifugal force in between the pulleys. Nonetheless, each V-block is held steady, for it is always supported at two spaced apart locations, by the first wall of the trough on the V-block contacting the engaging surface or the first convex surface of the rocker, and by the second wall of the trough contacting the second convex surface of the rocker.

When the belt begins to curve as it passes over a pulley, the V-block rotates in relation to the pin causing the point of contact between the straight edge of the opening in the link plate and the rocker to shift from the engaging surface to the first convex surface of the rocker. This shift in the point of contact can be made to take place smoothly by selecting a circular curve having a certain radius for the contour of the first convex surface, and joining the engaging surface to the first convex surface tangentially.

DETAILED DESCRIPTION OF THE PREFERRED EMBODIMENT

An embodiment of the present invention shall now be described, while making reference to the figures.

Figure 1:
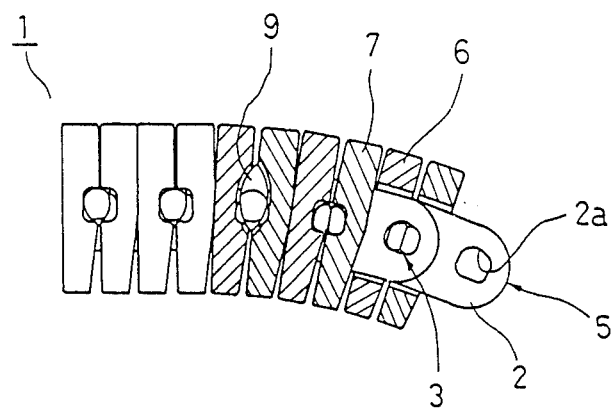
FIG. 1 is a partially cut away side view of the endless transmission belt according to the present invention.
Figure 2:
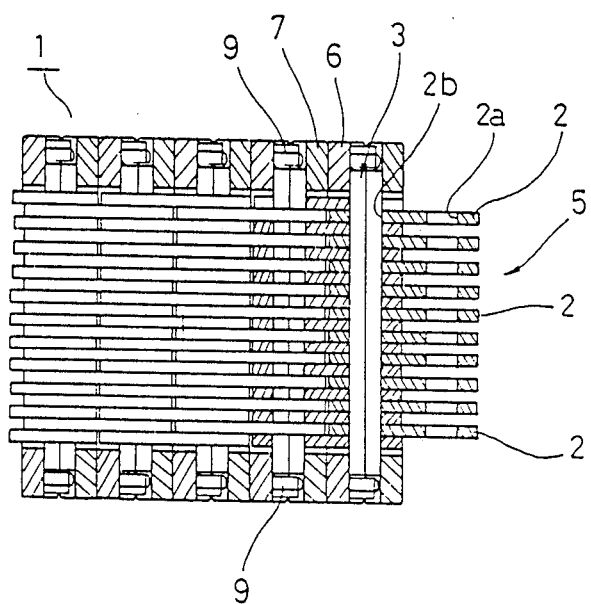
FIG. 2 is a cross-sectional view of the belt shown in FIG. 1.
Figure 3:
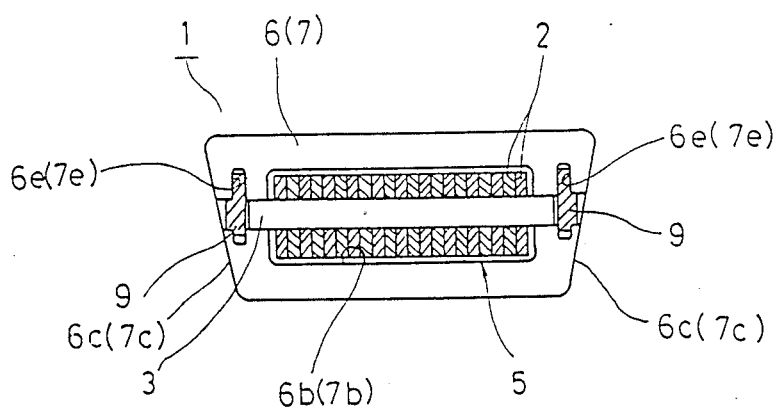
FIG. 3 is a longitudinal cross-sectional view of the belt shown in FIG. 1.

As indicated in FIGS. 1 to 3, the belt 1 for a continuously variable transmission comprises an endless link column 5 comprising a plurality of link plates 2 interconnected by pins 3, and first and second V-blocks 6 and 7 fitted to the link column. The link plates 2 are provided with openings 2a and 2b for the pins on each end, and by inserting the pins 3 through the openings 2a and 2b, the link plates are connected to one another to form the endless link column.

Figure 4:
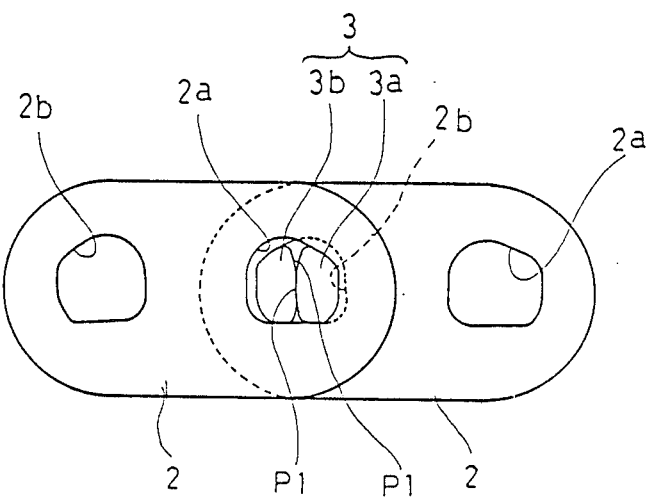
FIG. 4 shows the link column when straight.
Figure 5:
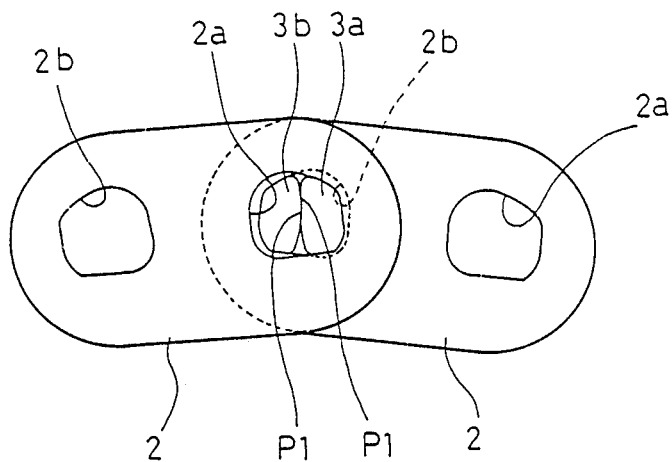
FIG. 5 shows the link column when curved.
Figure 6:
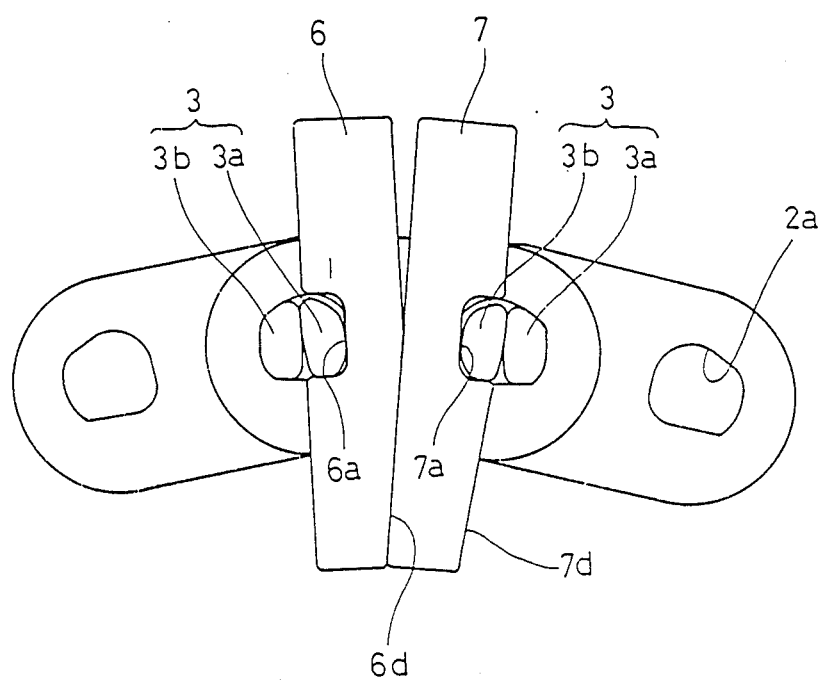
FIG. 6 shows the link column when curved, with the V-blocks fitted thereto.

As indicated in FIGS. 4 and 5, the pins 3 consist of a pair of rockers 3a and 3b provided with rolling contact surfaces P1, P1 on which they roll over one another. The pair of rockers 3a and 3b are inserted through an opening in the link plate, with their rolling contact surfaces facing one another. The pins 3 have a length larger than the width of the link column (Refer also to FIGS. 2 and 3).

The first and second V-blocks 6 and 7 are each provided with an opening 6b, 7b through which the link column extending, tapered sides 6c, 7c which contact the pulleys, and a trough 6a, 7a on the front or rear face to accomodate the pin. On one side of the V-blocks 6, 7, a taper is formed on the inner portion in order to enable the V-blocks 6 and 7 to incline against one another as the link column curves. The V-blocks are further provided with arresting grooves 6e and 7e each having a predetermined radius on the outer part of troughs 6a and 7a (Refer to FIG. 9(c)). The first and second V-blocks 6 and 7 accomodate the link column 5 in their openings 6b, 7b, and are held in place by an adjacent pair of pins 3 which engage the troughs 6a, 7a on opposite faces of two V-blocks to clamp the pair of V-blocks 6 and 7 therebetween, the pins being maintained in place by arresting pieces 9 fitted in the arresting grooves 6e, 7e.

Figure 7:
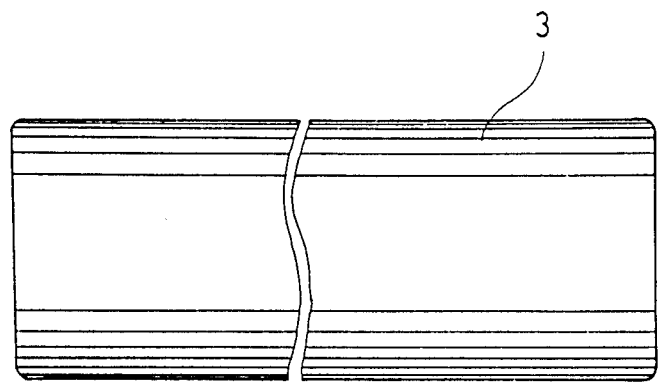
FIG. 7(a) is a side view of a rocker.
FIG. 7(b) is an enlarged end view of the same.
Figure 7:
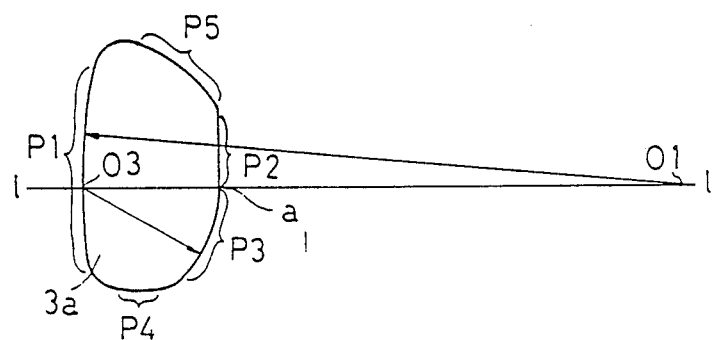

Since the two rockers are symmetrical to one another, explanation hereafter shall be made of one rocker 3a only. As indicated in FIG. 7(b), the rocker has a flat engaging surface P2 formed on the side opposite the rolling contact surface P1, and a first convex surface P3 having an arcuate cross-section with its center of curvature at point 03, immediately below, or toward the inside of the belt relative to engaging surface P2. The center of curvature 03 of the first convex surface lies at the intersection of rolling contact surface P1 with the normal 1-1 to the engaging surface P2 drawn from the point of contact a between the engaging surface and the first convex surface, so that the engaging surface is tangent to the circular arc comprising the first convex surface at point a. The rolling contact surface P1 also has a arcuate cross-section with its center of curvature at point 01, where point 01 lies upon normal 1-1. On the bottom of the rocker 3a facing the inside of the belt, is a second convex surface P4 having an arcuate cross-section with a large radius, which connects the rolling contact surface P1 and the first convex surface P3 through rounded corners having prescribed radii. A third convex surface P5 arcuate cross-section with a radius that is larger than that of the first convex surface P3 is formed immediately above the engaging surface P2, and is connected to the upper end of the rolling contact surface P1 at its other end through a rounded corner having a prescribed radius.

Figure 8:
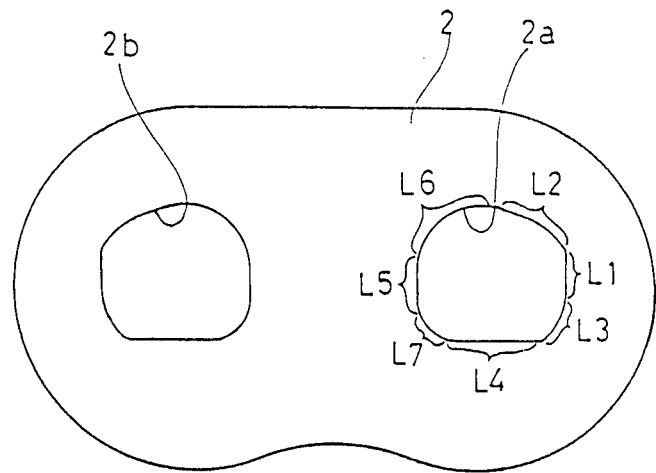
FIG. 8 is a side view of a link plate.

As indicated in FIG. 8, the link plate 2 is provided with openings 2a and 2b for the pins on each end. Because the two openings are symmetrical to one another, explanation hereafter shall be made for opening 2a only. A first planar face L1 extends along a straight side of the opening toward the outer end of the link plate, where tensile force is exerted by the pin. Immediately above the first planar face toward the outside of the belt, is a first concave face L2 extending in a circular arc with a radius equal to that of the third convex surface P5 of the rocker. Immediately below the first planar face toward the inside of the belt, facing the first convex surface P3 of the rocker, is a second concave face L3 having a radius equal to or larger than that of the first convex surface P3. On the bottom of the opening 2a an toward the center of the link plate, where no tensile force is exerted by the pin, a planar bottom face L4, a planar inner face L5 and rounded corners L6 and L7 having prescribed radii are formed in a manner so as to avoid interfering with rockers 3a, 3b. Hence, whereas the first planar face L1 and the first concave face L2 of the opening 2a of the link plate 2 make positive contact with the engaging surface P2 and the third convex surface P4 of the rocker 3a respectively, the second concave face L3 and the bottom planar face L4 do not necessarily contact the first convex surface P3 or the second convex surface P4 of the rocker, while the inner planar face L5 and rounded corners L6 and L7 are kept out of contact with the rocker 3b to avoid interference.

Figure 9A:
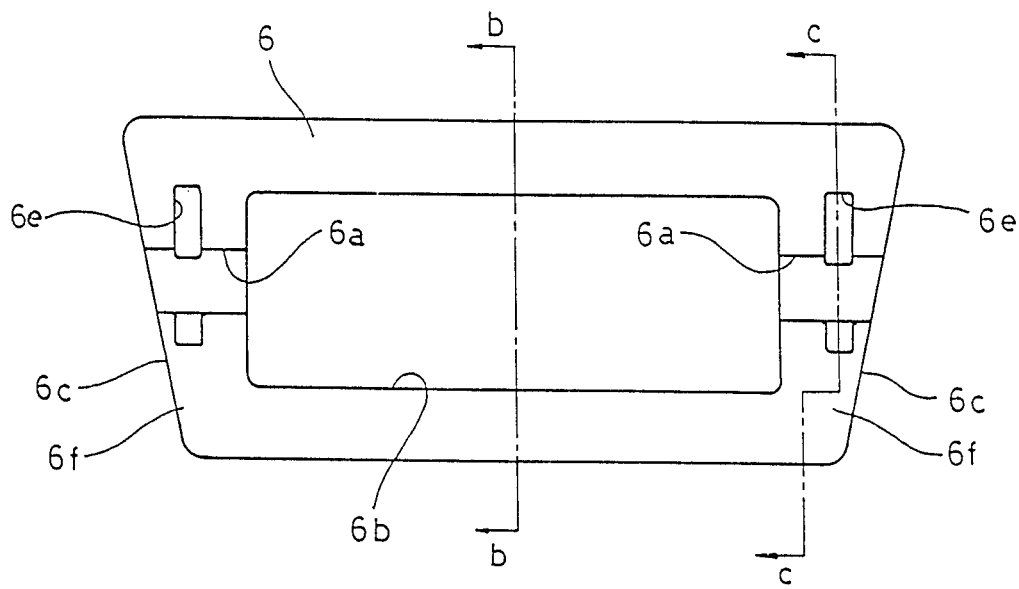
FIGS. 9a-9c illustrates the first V-block, with FIG. 9(a) being a front view, FIG. 9(b) being a cross-sectional view taken along line b—b in FIG. 9(a), and FIG. 9(c) being a cross-sectional taken along line c—c in FIG. 9(a).
Figure 9B:
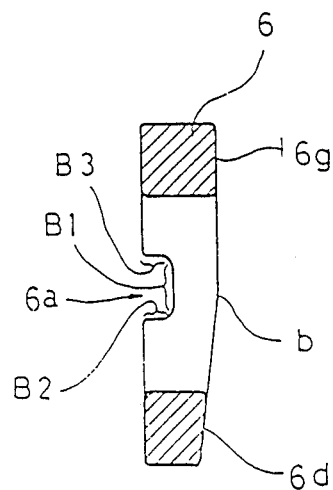
Figure 9C:
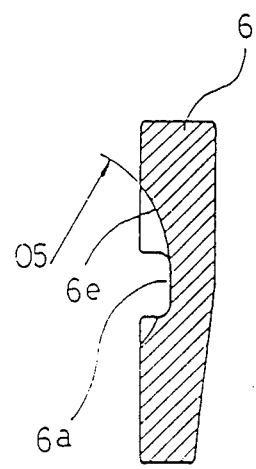

As indicated in FIGS. 9(a), (b) and (c), the first V-block 6 is provided with troughs 6a, 6a leading from the opening 6b to the tapered sides 6d, on the center portion of the legs 6f, 6f on each side. Midway along each trough 6a is an arresting groove 6e having a prescribed width and radius centered at point 05. The trough 6a lies at the same level as the line of intersection b between the tapered face 6d and the parallel face 6g. The bottom of trough 6a consists of a substantially flat and vertical first wall B1, while the lower face toward the inside of the belt consists of a substantially flat and horizontal second wall B2. Above the wall B1, and separated from wall B2 by a distance larger than the height of rocker 3a, is a horizontal third flat wall B3. Rounded corners each having a prescribed radius connect the wall B1 with walls B2 and B3. Thus, the first flat wall B1 of the V-block 6 contacts the engaging surface P2 of the rocker 3a when the belt is straightened, and the first convex surface P3 when the belt is curved, while the second flat wall B2 contacts the third convex surface P4 of the rocker.

Figure 10:
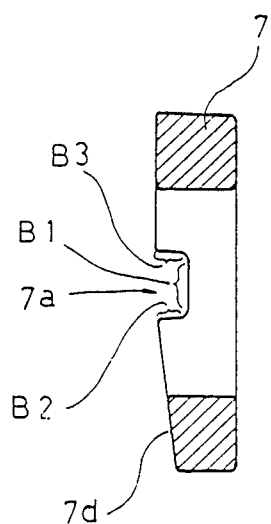
FIG. 10 is a cross-sectional view of the second V-block.

As may be seen from FIG. 10, the second V-block 7 differs from the first V-block 6, only in that the trough 7a is formed on the opposite face, i.e. on the face 7d, which is tapered in order to enable inclination of the V-block, the rest remaining identical to first V-block 6. Therefore, further explanation shall be omitted, while designating corresponding features using the same symbols in the figures.

The operation of the present invention shall now be described.

The endless transmission belt of the present invention is fitted around a pair of pulleys having variable diameters when in use. At the primary end, torque is transmitted from the primary pulley to the first and second V-blocks 6, 7 under frictional contact, and is then transmitted to the link column 5 through pins 3. To describe this in more detail, the force acting on the second V-block 7 is transmitted to the first V-block 6 the contact of the two V-blocks, the force acting on V-block 6 in turn being transmitted to the rocker 3a due to the contact between the first wall B1 of the trough of the V-block and the engaging surface P2 or the first convex surface P3 of the rocker. The force is then transmitted to the rocker 3b due to the contact between the rolling contact surfaces P1, P1 of the two rockers, and finally from the rocker 3b to the link plate 2 through the surface contact between the enaging surface P2 and the third convex surface P5 of the rocker, and the first planar face L1 and the first concave face L2 of the opening 2b on the link plate. Tension is thus applied to the belt on its tension side.

At the secondary end on the other hand, tension in the link column 5 is transmitted to the two V-blocks 6, 7 through pins 3, and to the secondary pulley by frictional contact between the pulley face and the tapered sides 6c, 7c of the V-blocks.

Under tension, the engaging surface P2 on the rockers 3a, 3b bear against the first planar faces L1 of the openings 2a, 2b due to the pressure acting between the two rockers at their rolling contact surfaces P1, P1 holding the rockers against the link plates 2. In addition to the surface contact between the engaging surface P2 and the first planar face L1, surface contact occurs also between the third convex surface P5 on the rockers and the second concave face L2 of the openings, so that the force acting between the rockers 3a, 3b and the link plates 2 is supported by surface contact over a large area.

Although the first and second V-blocks 6, 7 are continously forced outward by the force exerted by the pulleys on their tapered sides 6c, 7c, or by centrifugal force, they are nonetheless held steady due to linear contact at two separate locations, provided by the second (horizontal) wall B2 of their troughs contacting the second convex surface P4 of the rockers, and by the first (vertical) wall B1 of their troughs contacting the engaging surface P1 or the first convex surface P3 of the rockers. Since the contact is made between a flat surface and a convex surface, the surface loadings over the lines of contact are kept at relatively small values, despite the large forces acting between surfaces of contact B2 and P4, or B1 and P2 or P3 caused during transmission of force between the pins 3 and the V-blocks 6, 7.

When the belt encounters a pulley, the link column begins to curve. Under such condition, the rockers 3a, 3b which act as pivots roll over one another on their rolling contact surfaces to allow smooth rotation. At the same time, the point of contact of the first wall B1 on the V-blocks 6, 7 with the rockers 3a, 3b shifts from the engaging surface P2 to the first convex surface P3. Because the first convex surface P3 comprise a cylindrical surface tangent to the engaging surface P2, the shift takes place smoothly, without the occurence of uneven loading.

Although third convex surfaces P5 have arcuate cross-sections in the embodiment described above, they may also have other forms of convex surfaces , such as an involute or a curve with an infinitely large radius of curvature, i.e. a plane. The engaging surface P2 need not be planar either, but rather may also be a curved surface which approximates a plane, such as an arcuate surface with an extremely large radius of curvature.

Also, whereas the pins 3 are kept in place by arresting pieces 9 in the above embodiment, projections for keeping the pins in place may be formed integrally with the V-blocks by pressing, or a third V-block for keeping the pins in place may be fitted in between the first and second V-blocks.

As has been described, according to the present invention, because the rockers 3a, 3b are held in contact with the link plates 2 due to their engaging surfaces P2 engaging the planar faces L1 of the openings 2a, 2b, the load originating from the pressure between the rolling contact surfaces P1, P1 is supported over an area, so that the rockers can be held securely against the link plates 2 without the occurence of stress concentration, thus improving the durability of the pins 3 and the link plates 2.

Because the second wall B2 of the troughs 6a, 7a on the V-blocks 6, 7 contact the second convex surface P4 of the rockers, while the first wall B1 of the troughs contact the engaginig surface P2 or the first convex surface P3 of the rockers, the V-blocks are held securely at two separate locations in the tangential and radial directions, while the surface loading at the points of contact, thus improving the durability of the V-blocks 6, 7 and the pins 3, and also improving the torque transmitting capacity of the belt 1.

Because the rockers 3a, 3b, the openings 2a, 2b in the link plates 2 and the troughs 6a, 7a on the V-blocks 6, 7, all have simple geometrical shapes comprising combinations of flat and curved surfaces, they can be produce easily by pressing, extruding or machining.

Also, by making the engaging surface P2 tangent to the first convex surface P3 on the rockers 3a, 3b, the first wall B1 on the V-blocks 6, 7 can shift smoothly from the engaging surface P2 to the first convex surface P3. Combined with the rockers 3a and 3b rolling over one another on their rolling contact surface P1, the flexing of the belt can be made smooth, thus improving the transmission efficiency of the belt 1 while avoiding uneven loading, to improve the durability of the belt.

By designing the third convex surface P5 of the rockers 3a, 3b to have a radius of curvature that is larger than that of the first convex surface P3, and the first concave face L2 of the openings 2a, 2b with a curve matching that of the third convex surface P5, the load can be supported by surface contact over a large area, thus improving the torque transmittiing capacity of the belt 1 and also improving the durability of the pins 3 and the link plates 2.

By placing the center 01 of the radius of curvature for the rolling contact surface P1 on the line 1—1 normal to the engaging surface P2 drawn from the point of contact between the engaging surface P2 and the first convex surface P3, the load originating at the rolling contact surface P1 can be exerted positively on the engaging surface P2 and the planar face L1 of the opening to secure the pin regardless of whether the belt is straight or curved, and the point of contact of the first wall B1 on the V-blocks can shift smoothly from the engaging surface P2 to the first convex surface P3 of the rockers when the belt begins to curve.

What is claimed is:

1. An endless transmission belt comprising:
   an endless column of interconnected link plates,
   each of the link plates having a pair of opposite ends and a respective opening extending through each of said ends, each said respective opening defined by at least a substantially flat planar face;
   a pin means extending through respective aligned ones of the openings of the link plates for interconnecting said link plates,
   each said pin means comprising a pair of rockers having respective rolling contact surfaces engaging one another for allowing the rockers to roll over one another along said contact surfaces,
   each of said rockers also having a substantially flat engaging surface opposite the rolling contact surface thereof, the planar faces of the link plates engaging said flat engaging surface of each of said rockers for preventing the rocker from rotating relative to the planar faces, a first convex surface having a predetermined radius of curvature and extending from the engaging surface toward the inside of the endless belt, the engaging surface being tangent to the first convex surface, and a second convex surface facing the inside of the endless belt; and
   V-blocks mounted to the link column between respective adjacent pairs of the pin means, each V-block having a trough extending therein, the trough bordered by a first flat wall selectively engaging the engaging surface and the first convex surface of a respective said rocker, and a second wall engaging the second convex surface of said respective rocker.

2. An endless transmission belt as claimed in claim 1, wherein each said rocker further has a third convex surface having a radius of curvature that is larger than that of the first convex surface, said third convex surface extending from the engaging surface toward the outside of the endless belt, and each said respective opening is also defined by a concave face adjacent the substantially planar face and having a radius of curvature that is substantially equal to that of the said third convex surface.

3. An endless belt as claimed in claim 1, wherein each said rolling contact surface has an arcuate cross-section having a center of curvature disposed at a predetermined point lying on a line that is normal to the engaging surface opposite thereto and extends from the point of intersection of the engaging surface and the first convex surface.

4. An endless transmission belt as claimed in claim 1, wherein each of said V-blocks includes first and second V-blocks engaging one another, each of said first and said second V-blocks having a said trough extending therein.

* * * * *